United States Patent
Keery et al.

(10) Patent No.: US 11,057,531 B2
(45) Date of Patent: Jul. 6, 2021

(54) OPERATING AN APPLIANCE SCANNER SYSTEM

(71) Applicant: Kodak Alaris, Inc., Rochester, NY (US)

(72) Inventors: Brian P. Keery, Spencerport, NY (US); Daniel Timothy Jarvis, Rochester, NY (US); Alla Shadunsky, Rochester, NY (US); Vincent J. Finn, Rochester, NY (US); Kenneth B. Button, Cohocton, NY (US)

(73) Assignee: KODAK ALARIS INC., Rochester, NY (US)

( * ) Notice: Subject to any disclaimer, the term of this patent is extended or adjusted under 35 U.S.C. 154(b) by 0 days.

(21) Appl. No.: 16/723,638

(22) Filed: Dec. 20, 2019

(65) Prior Publication Data
US 2020/0220985 A1    Jul. 9, 2020

Related U.S. Application Data

(60) Provisional application No. 62/788,014, filed on Jan. 3, 2019.

(51) Int. Cl.
*H04N 1/00* (2006.01)
*G06F 3/0482* (2013.01)
*G06F 21/62* (2013.01)

(52) U.S. Cl.
CPC ....... *H04N 1/00307* (2013.01); *G06F 3/0482* (2013.01); *G06F 21/6209* (2013.01)

(58) Field of Classification Search
None
See application file for complete search history.

(56) References Cited

U.S. PATENT DOCUMENTS 6,691,232 B1 * 2/2004 Wood .................. H04L 63/0815
726/6
9,038,157 B1 * 5/2015 Santiago, Jr. ......... H04W 12/06
726/9

(Continued)

FOREIGN PATENT DOCUMENTS

| EP | 1734733 A2 | 12/2006 |
| EP | 2184911 A1 | 5/2010 |
| WO | 20120102710 A1 | 8/2012 |

OTHER PUBLICATIONS

International Search Report and Written Opinion issued in PCT/US2019/068272 dated Apr. 2, 2020.

*Primary Examiner* — Anh-Vinh T Nguyen
(74) *Attorney, Agent, or Firm* — Hogan Lovells US LLP

(57) ABSTRACT

A method and system for operating an appliance scanner system. A device can maintain at least two isolated communication channels, one to connect to a configuration service and others for connecting to document processing and management services. This can enable the configuration service to reside outside of a secure network. Firewalls and policies can prevent content generated at the scanner from exiting the secure network and reaching the configuration service. To set up the scanner, it can be initiated and connect to the configuration service via a operations communication channel. The configuration service can then instruct the scanner how to connect to various document services through one or more generated content communication channels. Furthermore, document services can communicate validation information back to the scanner.

20 Claims, 7 Drawing Sheets

(56) References Cited

U.S. PATENT DOCUMENTS

| | | | | |
|---|---|---|---|---|
| 9,288,198 | B2* | 3/2016 | DeSoto | H04L 63/08 |
| 9,454,341 | B2* | 9/2016 | Landry | G06F 3/147 |
| 9,747,758 | B1* | 8/2017 | Brancaccio | G06Q 40/00 |
| 10,223,048 | B2* | 3/2019 | Tonegawa | G06F 3/1238 |
| 10,397,759 | B1* | 8/2019 | Fahmy | G06K 7/10386 |
| 10,438,177 | B2* | 10/2019 | Nayfack | G06Q 20/02 |
| 10,440,020 | B1* | 10/2019 | Bermudez | G06Q 40/025 |
| 10,534,924 | B2* | 1/2020 | Li | G06F 21/10 |
| 2006/0236366 | A1 | 10/2006 | Walczyk et al. | |
| 2007/0038313 | A1 | 2/2007 | Bridges et al. | |
| 2007/0133040 | A1 | 6/2007 | Tredoux et al. | |
| 2008/0195456 | A1* | 8/2008 | Fitzpatrick | G06Q 10/06311 |
| | | | | 705/7.15 |
| 2008/0218792 | A1* | 9/2008 | Murata | H04N 1/233 |
| | | | | 358/1.15 |
| 2010/0134816 | A1 | 6/2010 | Dantwala | |
| 2010/0211951 | A1* | 8/2010 | Ito | G06F 3/1291 |
| | | | | 718/100 |
| 2011/0023024 | A1* | 1/2011 | Masuda | G06F 3/122 |
| | | | | 717/176 |
| 2012/0110155 | A1 | 5/2012 | Adlung et al. | |
| 2013/0254114 | A1* | 9/2013 | Smith | G06Q 20/20 |
| | | | | 705/67 |
| 2013/0311386 | A1 | 11/2013 | Tehranchi et al. | |
| 2014/0063531 | A1 | 3/2014 | Deter et al. | |
| 2015/0116745 | A1* | 4/2015 | Niimura | H04N 1/00954 |
| | | | | 358/1.13 |
| 2015/0213197 | A1* | 7/2015 | Brennan | C09K 11/7774 |
| | | | | 235/375 |
| 2016/0026995 | A1* | 1/2016 | Edmiston | G06Q 20/204 |
| | | | | 705/44 |
| 2016/0277374 | A1* | 9/2016 | Reid | H04L 63/101 |
| 2017/0064554 | A1* | 3/2017 | Li | H04L 63/101 |
| 2017/0353621 | A1* | 12/2017 | Saito | H04N 1/32406 |
| 2018/0082093 | A1* | 3/2018 | Crooks | G06K 19/06037 |
| 2018/0360410 | A1* | 12/2018 | Sun | G16H 30/40 |
| 2019/0158692 | A1* | 5/2019 | Fujiwara | H04N 1/00734 |
| 2019/0313246 | A1* | 10/2019 | Nix | H04L 9/3263 |
| 2019/0327258 | A1* | 10/2019 | Choi | G06F 21/577 |
| 2020/0067711 | A1* | 2/2020 | Abadir | H04L 63/123 |
| 2020/0104474 | A1* | 4/2020 | Duane | G06Q 20/425 |
| 2020/0119920 | A1* | 4/2020 | Kohli | H04L 9/3268 |
| 2020/0160965 | A1* | 5/2020 | Lyman | G06F 21/6254 |
| 2020/0288024 | A1* | 9/2020 | Yamaguchi | H04N 1/00514 |
| 2020/0319831 | A1* | 10/2020 | Kobana | G06F 3/1238 |
| 2020/0405440 | A1* | 12/2020 | Shelton, IV | A61B 90/98 |
| 2020/0410122 | A1* | 12/2020 | Alacar | H04N 1/00244 |
| 2021/0021733 | A1* | 1/2021 | Nagano | G06F 21/608 |

* cited by examiner

OPERATING AN APPLIANCE SCANNER SYSTEM

CROSS REFERENCE TO RELATED APPLICATION

The present application relates to and claims priority from U.S. provisional patent application entitled OPERATING AN APPLIANCE SCANNER SYSTEM, Ser. No. 62/788,014, filed on Jan. 3, 2019. The disclosure of the above-identified provisional application is hereby incorporated by reference in its entirety.

BACKGROUND OF THE INVENTION

Before the advent of digital document management systems, many businesses developed complicated workflows for how to move paper and information between departments and people in order to complete a task. Securing these workflows required physical containment of the papers and people. With the advent of digital systems, companies have attempted to modify their existing workflows to take advantage of the enhanced capabilities afforded by scanners, networks, and automated digital systems. While some of these modifications can greatly enhance efficiencies within a workflow, they can also introduce security vulnerabilities.

Workflows can include scanning forms and other documents for archival or data entry purposes. For example, a bank may be required to have their customers fill out and sign physical papers for a loan. The bank might then scan the documents and save the scan in a digital archive while a data entry specialist reviews the scan to extract pertinent information. These scanners might need to be serviced, updated, or otherwise maintained by a manufacturer or integrator who may prefer to do so remotely. Remote access to a scanner might be beneficial as it allows a maintainer to work on the scanner without being physically on-site, but it might also permit confidential data to leak outside of a secure environment or might otherwise fail data privacy requirements by sending data to a remote management server. Thus, what is needed is a better technique to facilitate remote servicing of a scanner while preventing unwanted data exfiltration.

DETAILED DESCRIPTION OF THE INVENTION

Figure 1:
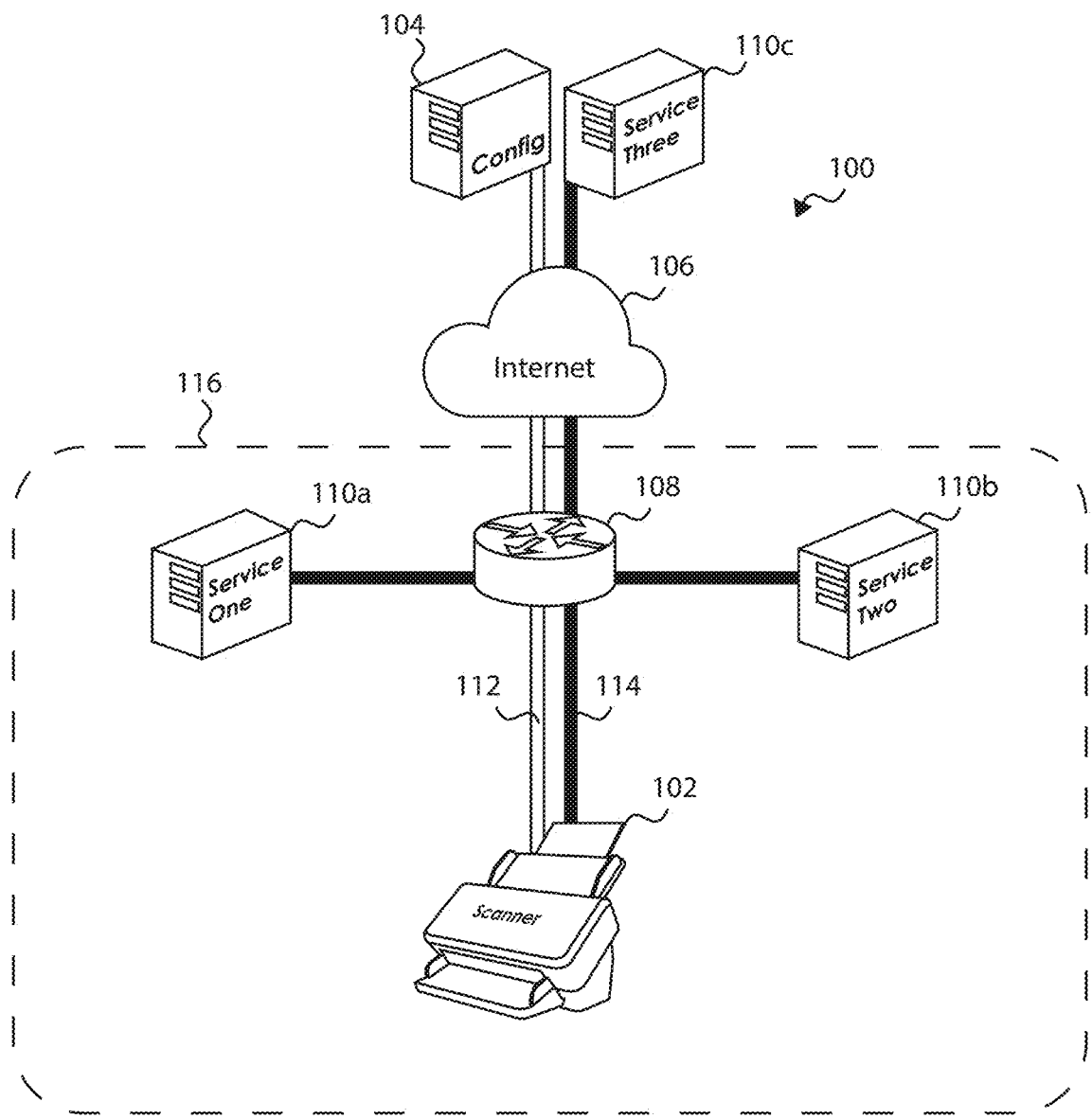
FIG. 1 illustrates an example network environment comprising a device, a first document service, a second document service, and a configuration service according to some embodiments of the present invention.

Described herein are principles for overcoming difficulties in isolating operational support of a scanner device from generated data for the scanner device. A scanner device can be configured to connect to an operations communication channel and a generated content communication channel. These channels can be separated and isolated to prevent generated content from leaving a secure network and being accessed by an operational support entity.

Document scanners have many applications in different environments including corporate offices, banking and financial institutions, law offices, governmental agencies, warehouses, and retail outlets. The networked appliance scanner can operate independently and without the need of an attached computer which allows it to operate in a range of environments, such as loading docks and warehouses. At these locations documents can be scanned such as invoices and bills of lading. Other applications of a networked document scanner include fax emulation, transmission of financial and medical records, digitizing official government documents such as tax forms, mortgage application processing, and real estate transactions. Each of these applications require varying levels of security to insure privacy, security, and compliance with government regulations such as HIPAA (Health Insurance Portability and Accountability Act) and GDPR (General Data Protection Regulation). Networked document scanners can implement or connect to third party business process applications such as Enterprise Resource Planning (ERP) systems, expense financial management systems, and process workflow automation systems. The networked document scanners can also implement or connect to other third party applications such as Optical Character Recognition (OCR), image processing applications, de-skewing applications, and the like. These 3rd party applications might have licensing requirements and the scanner manufacturer can provide a network accessible license provisioning service that connects with the scanner to ensure that the proper licenses are provided to each scanner. Depending on the environment, it can be critical that network access to the scanner by the manufacturer, value added reseller (VAR), and software license provisioner be limited to providing operational support to the scanner including setup, configuration, display panel and touchscreen soft button configuration, network access, and workflow configuration. These operational support entities can be isolated from generated content including or derived from the scanned documents. This can prevent unexpected exfiltration of personal, financial, medical, transactional, business, and legal information.

A method and system for operating an appliance scanner system are presented herein. A device such as a document scanner can maintain at least two isolated communication channels, one to connect to a configuration service and others for connecting to document processing and management services. This can enable the configuration service to be located outside of a secure network. Firewalls and policies can prevent content generated at the device from exiting the secure network and reaching the configuration service. To set up the device, the device can connect to the configuration service via an operations communication channel. The configuration service can then instruct the device how to connect to various document services through one or more generated content communication channels. Furthermore, document services can communicate validation information back to the device or device operator through the configuration channel (e.g., operations communication channel).

In the following description, some aspects of the present invention are described as software programs. The equivalent of the aspects of the inventions implemented in software may also be constructed as hardware or software within the scope of the invention.

FIG. 1 illustrates an example network environment 100 comprising a device 102, a first document service 110a, a second document service 110b, a third document service 110c, and a configuration service 104. The elements composing the network environment 100 can serve various purposes as part of a document processing workflow. For example, a configuration service 104 can maintain a device 102 which can scan a document for processing at document services 110a, 110b, and/or 110c. The services described herein (e.g., the first document service 110a, the second document service 110b, the third document service 110c, and the configuration service 104) can be provided by respective dedicated physical devices. Alternatively or additionally, such services can be hosted as virtual machines, containers, or other software service packages on hardware that is not dedicated to the respective service (as might be used in a "cloud" paradigm). The elements of network environment 100 can be connected via networking components such as router 108 and the Internet 106. Certain components can reside within a secure network 116.

A device 102 as described herein can capture and distribute images. The device 102 can generate or capture imagery data from physical objects. For example, the device 102 can be a scanner or camera. The device 102 can be a standalone unit or part of a multi-function device such as a photocopier. The documents supplied to the device 102 can be scanned for data entry purposes. The information from these documents can be extracted and supplied to a database and/or a web API for a business process. While traditional techniques favored scanning a document to storage, whereby a user could manually retrieve and use the stored documents, the present techniques also facilitate scanning a document to a business process or cloud service. The scanning process not only can communicate scanned document information but also trigger a next stage in a document processing pipeline by external or disconnected entities. These documents might be sensitive or secret and the device 102 can be configured to handle confidential material appropriately.

It should be understood that the principles described herein for a device 102 are also applicable to other sensors and data entry systems. The device 102 can be a stand-alone device (e.g., connected to other services via a networking connection), a peripheral of another device (e.g., connected to a computer using a USB cable), and/or a component of a device. The device 102 can be part of a multi-function device having copy, print, fax, email, and other functionalities. The device 102 can be configured to immediately transfer data to other services and not store data in long-term storage. The device 102 can be configured to only store data that is encrypted.

The device 102 can have multiple communication channels, such as an operations communication channel and a generated content communication channel. These communication channels can be physically or logically isolated. Using two isolated communication channels simplifies the system and enables security and audit systems to more effectively identify and contain errant data. For example, if both communication channels pass through a router 108 (or other network device such as a firewall), the router 108 can apply a certain security policy to one communication channel and a different security policy to the other communication channel. If a communication on a communication channel violates a security policy for that communication channel, then the router 108 can reject the communication.

The device 102 can have two physical ports, facilitating two physical connections in a network. One port can be for one communication channel and the other port can be used for the other communication channel. The device 102 can use a wireless interface for one communication channel and a physical interface for another communication channel. A communication device can be temporarily connected to the device to facilitate a communication channel. For example, the scanner device 102 can have a primary interface for connecting to a generated content communication channel 114 and a user can connect the device 102 to a secondary interface such as a wireless dongle for connecting to an operations communication channel. After performing necessary operations, the user can remove the secondary interface. Other interfaces are contemplated such as wireless interfaces, Ethernet, optical, and USB.

The device 102 may have two or more virtual interfaces that share a single physical interface. For example, an operating system on the device 102 can manifest two Media Access Control (MAC) addresses, two Internet Protocol (IP) addresses, or other identifiers for a single physical interface. Each virtual interface can correspond to a different communication channel with associated rules and policies.

In order to isolate communication channels that use a same physical interface, the system can logically isolate them. For example, data can be "tagged" (e.g., put channel information in a header or other communication metadata) according to the appropriate communication channel. An enforcement system can then ensure that tagged data is only send to approved destinations. An operating system at the device 102 can classify groups, "users," software, processes, threads, etc. and enforce security policies based on the determined classifications (e.g., using a firewall). The device 102 can program an embedded network controller to establish the various communication channels and logically isolate them.

Logically isolating communication channels can include restricting the ports, destinations, protocols, tags, and/or metadata for data along those channels. In other words, only certain groups, users, programs, processes, threads, and operations can utilize a certain communication channel and the data for that communication channel can be restricted according to policies. The device 102 can have a secure component configured to sign data to be sent on the operations communication channel (or validate data received therefrom). This secure component can be configured to only sign data that is not user generated. Another secure component can sign data that is user generated, but such signing will not permit the data to be transmitted on the operations communication channel.

Two interfaces (whether physical, virtual, or logical) can connect to the same system such as a switch or router. An internal policy (e.g., a firewall on the device 102) or an external policy (e.g., a firewall on a router 108) can ensure that data from one interface is not distributed to an unauthorized destination. The combination of physical, virtual, or logical interfaces with policies can constitute a "communication channel" whereby data for one communication channel is directed to a limited subset of destinations from a limited subset of sources.

A secure network 116 can be created for secure communications. The secure network 116 can be a physical network 116 such that devices on secure network 116 are physically isolated from devices outsides of the secure network 116. The secure network 116 can access external resources (e.g., resources located on the Internet 106) via a limited number of gateways or access points (e.g., router 108). Such a gateway can be configured to have increased security to prevent undesired access within secure network 116. The secure network can be a separate Local Area Network (LAN) such as a Virtual LAN (VLAN) or a distinct IP subnet. The secure network 116 can be defined by a geographical region such as a country or economic region (e.g., the European Union).

The secure network 116 can satisfy certain regulatory or policy requirements concerning data protection, privacy, or security. For example, certain workflows may require handling of confidential, secret, sensitive, or private data as defined by corporate or regulatory policy. For example, an insurance company might have workflows that deal with personally identifiable health information subject to HIPAA (Health Insurance Portability and Accountability Act of 1996 in the United States) regulations while an online retailer may have purchase data subject to GDPR (General Data Protection Regulation of the European Union) regulations. Similar regulatory or business data regulations include the Gramm-Leach-Bliley Act for financial services, the Fair Credit Reporting Act for credit systems, and the Electronic Communications Privacy Act. External networks might not satisfy all of these requirements. For example, confidential information generated at the device 102 can be required to stay within secure network 116 so that an entity can maintain direct control over the confidential information. Certain external resources (e.g., configuration service 104) can be within a secure environment that would satisfy regulatory burdens but can be isolated nonetheless to minimize the attack surface of confidential information and to simplify the security framework.

Various techniques can be implemented at router 108 to ensure that only authorized external transmissions are routed within the secure network 116. For example, configuration service 104 can be required to authenticate using a Virtual Private Network (VPN) system to access the secure network 116.

The configuration service 104 can be physically located off-site from the secure network 116. The configuration service 104 can be running in a "cloud" environment hosted by a third party. The configuration service 104 can be a virtual machine, a container, a process, a bare metal device, etc. The configuration service 104 can be a single resource or a federation of resources.

The configuration service 104 can help set up the device 102 for a first use. For example, after initialization, the device 102 can first connect to the configuration service 104 to receive necessary configuration information, updates, and instructions for normal operation. The configuration service 104 can maintain a connection with the device 102 to get status updates from the device 102. Communications to and from the configuration service 104 can be limited to the operations communication channel. The device 102 may only trust firmware updates that are signed by an authenticated system.

The configuration service 104 can enable an IT professional to provide remote assistance to a user of the device 102. For example, the device 102 can include a "help" button which can direct an IT professional to help the user at the device 102. When the help button is pushed, a notification can be sent from the device 102 to the configuration service 104 which can then alert a professional associated with the manufacturer or integrator to help the user. The configuration service 104 can retrieve status information for the device 104 to assist the professional in diagnosing the issue or guiding the user through a workflow. The configuration service 104 can be used to support multiple devices 102. The configuration service can, for example, push an update to each device 102 with a single user command.

The configuration service 104 can maintain licensing information for the device 102. For example, a user of the device 102 might need to pay a licensing fee to use the device 102 and the configuration service 104 can keep track valid licenses and can assign licenses to the device 102. The configuration service 104 can similarly collect and distribute registration information and can bind the device 102 to a specific customer. If the device 102 is not registered by a customer, then the device 102 can receive instruction that it is unregistered. If the device 102 does not have a license, then it can be put in a limited operation state. The device 102 can utilize third party licenses for various tasks. For example, the device 102 can utilize third party Optical Character Recognition (OCR) software. The configuration service 104 can assign, maintain records of, and distribute third party licenses. A license can also include an End User License Agreement (EULA) or similar contractual agreement that may or may not include financial obligations. The configuration service 104 can track usage according to a licensing scheme. For example, a certain license might be billed according to the number of pages scanned or processed, an amount of time the license is provisioned to a device, the amount of time a device is turned on, and/or a number of users that are assigned to a device and/or license. The configuration service 104 can coordinate payment for the licenses and can optimize license distribution to minimize costs (e.g., deprovision a license that is not being utilized). The device 102 can request licenses necessary for a workflow from the configuration service 104.

The configuration service 104 can maintain workflow configuration information. Certain data extraction and validation procedures can be organized as workflows. The configuration service 104 can send workflow information to the device 102 via the configuration channel. The configuration service 104 can also receive, process, and distribute updates to workflows. A workflow can include scanning parameters, such as a resolution, size (e.g., A4, letter, legal), color depth (including grayscale or monochrome), one or more output file types (e.g., .jpg, .png, .pdf), compression amount, maximum file size, page count, single or double sided scanning, source (e.g., auto-feeder or flatbed), illumination source (front-lit or back-lit), etc. The workflow can specify preprocessing such as de-skewing or other transformations, contrast adjustments, brightness adjustments, OCR, filters (e.g., high-pass and/or low-pass filters), and other enhancement processes. A workflow can specify data extraction parameters such as on what pages and locations data is located within a document. A workflow can specify storage requirements such as a local storage location. A workflow can include security instructions to prompt for identity via the device 102 key pad, keyboard, peripheral card reading device or associated smartphone. Such instructions can also specify an encryption type, an encryption key, a signing key, and/or file permissions (e.g., the device 102 can indicate that the file can only be accessible by a certain user, group, program, or process). The device 102 can have a cryptographic key storage and the configuration service 104 can point to a certain key in the cryptographic key storage for a workflow even if the workflow definition and the configuration service 104 do not have the cryptographic key.

A workflow can inform Graphical User Interface (GUI) elements and experiences on the device 102. For example, a workflow can include a display graphic, title text, selectable options, user prompts, etc. for communicating with an operator of the device 102. For example, a workflow can prompt the user for the number of pages they are scanning and device 102 will compare the user count to the actually scanned pages and pass both counts to the document service where the service can ensure all counts are the same proving all information physically controlled is now digitally controlled. This can help identify scanner errors which may occur if two documents go through the device at the same, or substantially the same, time. An example workflow for scanning tax documents can prompt the user whether they have various documents such as a W-2, a 1099, etc. The user can then, using an interface on the device 102, indicate that certain forms are present. The device 102 can also prompt which forms should be scanned at which time (e.g., "Please insert your W2 into the scanner").

A workflow can specify a destination identifier for scanned documents. For example, the workflow can specify a service address such as an IP address, Uniform Resource Locator (URL), subnet, port, etc. A workflow can specify a post-office address (e.g., the workflow can specify that a document is scanned and validated, and a certificate of completion can be mailed to the post-office address), an email address, a phone number, etc. A workflow can provide security information for a destination identifier. For example, the workflow can include a security key or identify a key in the device 102 key store that should be used in communications with the destination. A workflow can include more than one destination.

A workflow can indicate fields in a document. For example, the workflow can specify where text to be extracted or other information should be located on a scanned document. The workflow can indicate a page number and location for these fields. A workflow can indicate that a document is a multi-page document such a collection of tax forms or bank forms.

A workflow can include multiple steps to be completed by multiple components or services. The configuration service 104 can send only relevant parts of the workflow to a component. For example, the configuration service 104 can instruct the device 102 to scan a document and send the result to a first document service 110a. The configuration service 104 can then instruct the first document service 110a to validate the document and then send the document to a second document service 110b which can then be instructed to save the document. Additionally or alternatively, the configuration service 104 can send complete workflow instructions to the device 102 which can be relayed to particular services along with the document. For example, document service 110a might not have access to configuration service 104; device 102 can receive and relay validation requirements for a scanned document to document service 110a which document service 110a can then interpret to validate the scanned document. The device 102 can send documents outside of the secure network 116 using the generated content communication channel 114. For example, the device 102 can send documents to any endpoint connectable via the Internet 106 such as the third document service 110c.

A workflow can indicate validation parameters for a document. For example, a workflow can indicate an expected number of pages in a document (or that a document should have more than X pages and/or less than Y pages). A workflow can specify the expected order of pages or sub-documents within a multi-part document. A workflow can specify what fields are required and which are optional. A workflow can include validation parameters for a specific field, such as a regular expression to satisfy or an indication of the type of data (Social Security Number, phone number, date, photo, check mark, etc.) that is expected for a field. A workflow can provide more detailed validation. For example, if the workflow pertains to a tax form, it can specify that one field is the correct sum of other fields. Other detailed validation can include dependent validation (e.g., the validation of field Y is dependent on the value of field Z), external validation (e.g., that a signatory on a document is listed within an authorized signors database), or other complex validation. A validation parameter can specify a quality of a document. For example, if a document is torn, disfigured, rotated, folded, etc. then the document can fail validation. A validation parameter can specify a quality of a scan of a document. For example, if a document scan (e.g., the data representing the document) is too low of quality, is over/under exposed, cut off, etc. then the document scan can fail validation. Some validation processes can indicate a failure (e.g., that the document must be redrafted and/or rescanned), while other validation processes can indicate warnings to prompt further review by an operator. Further review might be required if, for example, a number is outside of an expected range but is still valid. For example, if a tax form represents a salary that is far above or below the typical salary indicated on such documents, an error might be present.

The configuration service 104 can maintain connection information. For example, the configuration service 104 can contain information on how to connect the device 102 to the secure network 116 and interact with document services 110a and 110b. Connection information can include registration credentials and network parameters. For example, the configuration service 104 can direct the device 102 to connect to a specific WiFi network and the configuration service 104 can provide the appropriate network password for connection. Connection information can be effective to establish generated content communication channel 114 whereby the device 102 can securely communicate with other services. Such connection information can include security parameters, keys, tokens, ports to open, data tagging techniques, and any other necessary configuration information as described herein.

The configuration service 104 can maintain status information for the device 102. While the device 102 might solely send generated content over the generated content communication channel 114, the device 102 can also transmit status information to the configuration service 104 over operations communication channel 112. The configuration service 104 can then provide insights to a manufacturer of device 102, implementers thereof, or other interested parties that might not be authorized to access generated content but have an interest in determining the status of the device 102. Status information can include general status information such as whether the device 102 is powered on, any errors with the device 102, or whether the device 102 is connected to a communication channel. Status information can include statuses for specific workflows such as whether a certain workflow is currently being executed, the state of a current workflow, the number of times a workflow has been executed, an identifier for a current user of the device 102, etc. The configuration service 104 can routinely poll status updates from the device 102. The device 102 can send status updates as the state of the device 102 changes.

The configuration service 104 can provide updates to the device 102. For example, a firmware update can add new features to the device 102 or patch security issues with the device 102. Updates can include a list specifying which users can operate device 102. Updates can include modifications of any of the configuration data described herein such as communication channel configuration data, secure network 116 information, etc. The device 102 can have hard-coded restrictions that updates cannot overwrite. For example, the device 102 can require that all generated content be encrypted by an unexportable private key which can only be decrypted by authorized services. The configuration service 104 can "push" updates to the device 102 the moment they are available. Additionally or alternatively, the device 102 can request updates 104.

The configuration service 104 can be accessible by a third party such as a vender or an implementer for the device 104. This can enable the third party to maintain the device 102 without having access to generated content from the device 102. It should be understood however, that configuration service 104 need not be located on an external system. For example, configuration service 104 can be located within secure network 116. Utilizing two isolated communication channels 112 and 114 ensures that generated content does not arrive at configuration service 104. This helps harden the security profile of the system as a whole. Regardless of where the configuration service 104 is located, if it is compromised, sensitive data exfiltration at the configuration service 104 is frustrated because it has never received any sensitive data.

A document service 110 (e.g., document services 110*a* and 110*b*) can be a program, software package, container, server, endpoint, and/or interface. A document service 110 can be a single resource or a collection of resources. A document service 110 can include human operations such as a person reviewing a document. A document service 110 can receive, validate, and store documents and document images as described herein relative to various workflows. A document service 110 can communicate workflow status information to the device 102 and/or the configuration service 104. For example, when the particular document service 110 completes a portion of a workflow, it can update the configuration service 104 and the device 102. The device 102 can then display the status update for the user. If there are any errors at the documents service 110, then those errors can be presented to the user at the device 102.

A document service 110 can retrieve workflows from the configuration server 104 as described previously. The document service 110 can perform the same task(s) for each document it receives and does not require dynamic configuration. Alternatively or additionally, the document service 110 can receive instructions on how to process a specific document. For example, the device 102 can transmit (over generated content communication channel 114), a document to a document service 110 along with a description of the appropriate workflow. Document service 110 can then request workflow parameters from the configuration service 104. Device 102 can send workflow parameters with a document to a document service 110.

A first document service 110*a* can receive a document, process the document, and then send information to a second document service 110*b*. For example, the first document service 110*a* can relay the scanned image of the document, a processed image of the document, form data extracted from the document, or other information derived from the document. The first document service 110*a* can relay workflow information (or a portion thereof) to the second document service 110*b*.

Figure 2:
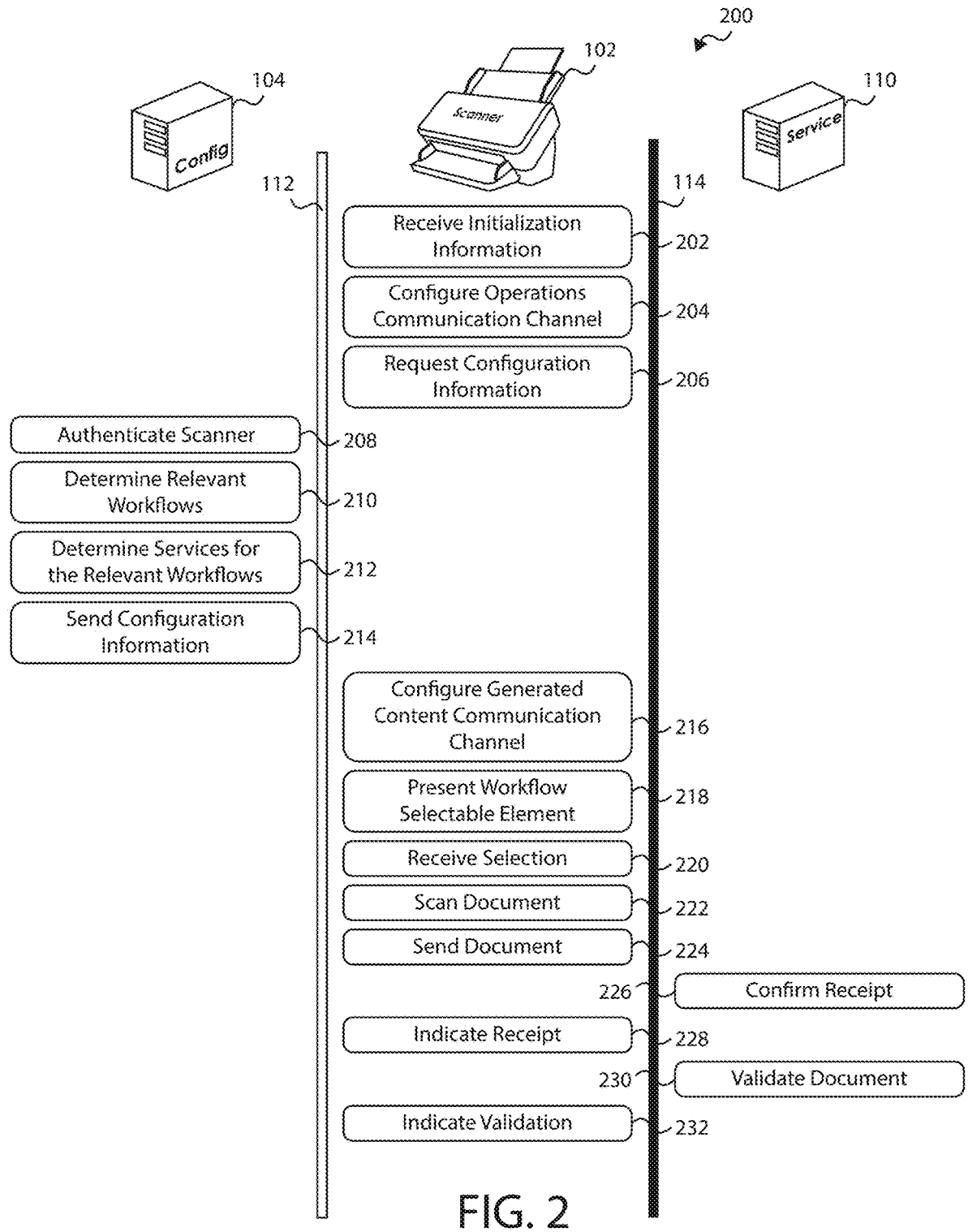
FIG. 2 illustrates an example process according to some embodiments of the present invention.

FIG. 2 illustrates an example process 200 according to some embodiments. In FIG. 2, a device 102 is represented in communication with a configuration service 104 via an operations communication channel 112 and a document service 110 via a generated content communication channel 114. It should be understood that more, fewer, or alternative steps can be performed. Furthermore, alternative orders or steps and alternative configurations of devices and connections are contemplated. At the start of example process 200, the scanner 102 has not been initialized and the communication channels 112 and 114 are not yet established.

Figure 4:
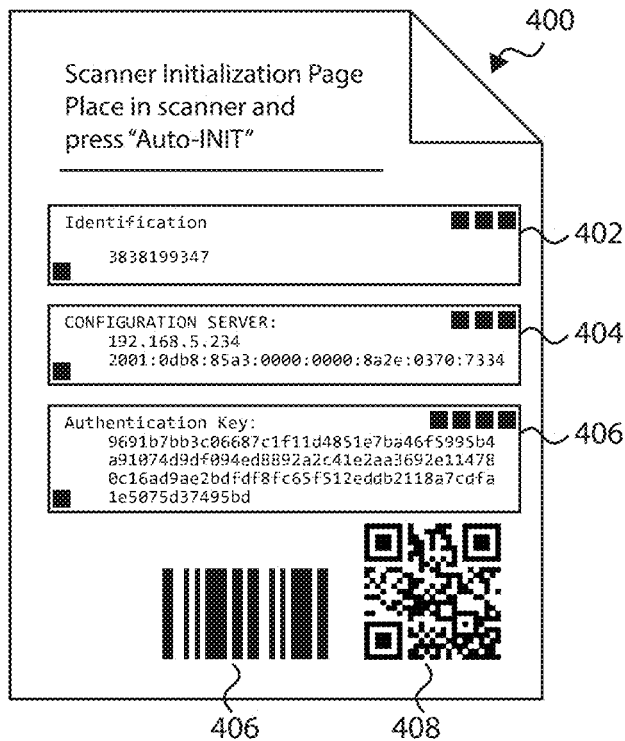
FIG. 4 illustrates an example initialization page that can be used to initialize the device according to some embodiments of the present invention.

The device 102 can receive initialization information (step 202). For example, an operator can provide initialization information to the device 102. The operator can manually supply initialization using a human interface device and/or using an initialization page as illustrated in FIG. 4. Initialization information can include basic setup parameters, including that which is necessary to connect to the configuration service 104. The initialization information can specify an address for the configuration service 104.

The device 102 can configure the operations communication channel 112 (step 204) using the initialization information. For example, the device 102 can set firewall policies such as opening ports on an interface of the device 102 and loading network credentials into a key store. Configuring the operations communication channel 112 can include sending data to network elements such as a switch, router, gateway, etc.

The device 102 can request configuration information (step 206) from the configuration service 104. The document service 102 can also request any updates from configuration service 104. The configuration information can include instructions and/or parameters for connecting to the generated content communication channel 114.

The configuration service 104 can authenticate the device 102 (step 208). For example, the device 102 can provide a unique identifier specific to the device 102 and the configuration service 104 can verify, using the identifier, that the device 102 is licensed or authorized. The configuration service 104 can determine a customer account associated with the device 102. The configuration service 104 can generate the initialization page described herein which can include the unique identifier; thus, the device 102 can extract that unique identifier and send it with the configuration request for authentication. Authenticating the scanner may include verifying that the scanner's network location is valid, such as by verifying that the request comes from an authorized location on the network (e.g., IP address).

The configuration service 104 can determine relevant workflows (step 210). The configuration service 104 can be dedicated to a single customer or to multiple customers. The configuration service 104 can maintain workflows specific to a customer and/or workflows that can be useful for many customers. Template workflows can be available for multiple customers but can be modified for a specific customer. Identifying relevant workflows can include determining a security domain for the device 102 and then identifying relevant workflows for that security domain. For example, the configuration service 104 can determine that a certain device 102 is associated with a certain profile, cryptographic key, account, etc. and can find workflows that are applicable to that security domain. The configuration service 104 can detect document services 110 that are available for the device 102 and infer which workflows are available based on the available document services 110. As a basic example, the system can determine that a document service 110 is a printer and the configuration service 104 can then determine that a "print" workflow is relevant. These workflows can be generated just-in-time at the configuration service 104 and/or pre-generated and stored in a database for later retrieval.

The configuration service 104 can determine document services 110 for the relevant workflows (step 212). For example, a workflow can specify document services 110 that are necessary for the workflow. The workflow can specifically identify a document service 110 (e.g., using an IP address or URL) or it can specify the necessary characteristics of a document service 110 (e.g., that it has OCR capabilities, printer capabilities, a license to $3^{rd}$ party software, etc.). If the workflow does not specifically identify a document service 110, the configuration service 104 can determine, from a list of available services, the document services 110 that can satisfy the requirements of the workflow. If there are multiple document service 110 instances that can satisfy the same role, the configuration service 104 can assign an instance to the workflow. The device 102 can additionally or alternatively determine document services 110 for the relevant workflows based on the requirements for a workflow.

The configuration service 104 can send configuration information (step 214) to the device 102. This can be performed over the operations communication channel 112.

The device 102 can configure the generated content communication channel 114 (step 216) using the configuration information. This can include registering on a network (e.g., secure network 116), joining a domain, workgroup, or other organization structure. The configuration information can include information usable by the device 102 to store credentials for maintaining the generated content communication channel in a key store on the device. This configuration can include white-listing destinations, ports, protocols, etc. in a firewall on the device 102. There can be multiple generated content communication channels 114 for multiple document services 110.

The device 102 can present a workflow selectable element (step 218). For example, a graphical user interface of the device 102 can present an icon, a title, etc. for the workflow. A separate device such as a phone, tablet, laptop, or other computing device can present the selectable element. Such devices can be in communication with the device 102. The device 102 can receive a selection of the selectable element (step 220). For example, a user can push a physical button associated with the selectable element or touch a screen where the selectable element is displayed. Again, a user might select the selectable element on a device that is physically separate from the device 102 which device can inform the device 102 of the selection.

The device 102 can prompt for credentials which can be used to identify the user and provide a customized experience for the user. For example, it can use the identity information to personalize workflows, determine appropriate workflows to present to the user, or modify a workflow for the user (e.g., by only presenting a relevant portion to the user). Such customizations can be based on information in a user's account, a user type, or other information associated with the user account or identity.

The service can authenticate a user. Such authentication can be the result of a requirement in a workflow. The configuration service can prompt for credentials via a USB attached peripheral such as card reader or keyboard, virtual keyboard via display panel, or linked mobile phone display. The system can use the identity to personalize workflows presented in step 218. A workflow can also be configured to required credentials to confirm the operator selecting is still in control of the scanner. The scanner 102 can prompt for credentials via USB attached peripheral such as card reader or keyboard, virtual keyboard via display panel, or linked mobile phone display. Scanner 102 can pass credentials to a 3rd party identity service using single or multiple factor authentication. The primary or secondary factors can be entered through a USB attached peripheral such as card reader or keyboard, virtual keyboard via display panel, or linked mobile phone display. Once confirmed, the selection is permitted to proceed. The scanner 102 can be configured to not retain credentials, other than to pass credentials to a 3rd party identity service, or beyond the duration of a single workflow.

The device 102 can scan a document (step 222). The device 102 can scan (e.g., capture), multiple pages, or multiple groupings of pages. The device 102 can automatically scan multiple pages or guide a user to supply each subsequent page. The device 102 can scan pages using a camera (e.g., a lens system and a sensor). The workflow information can provide instructions for scanning parameters such as contrast, brightness, saturation, color depth, file output type, compression factors, and filters to use, etc. The workflow can specify a source of the document for scanning (e.g., a flatbed tray or auto-feeder). The workflow can specify a page size such as A4 or 8.5"×11".

The device 102 can send the document (step 224) to the document service 110 over the generated content communication channel 114. In other words, the device 102 can process and send data representing an image of the document. The device 102 can encrypt the document using a private key or a key shared with the document service 110. The device 102 can compress the document data. The device 102 can simultaneously send the document to a second document service 110*b*. For example, a first document service 110*a* can provide archival functionality whereas a second document service 110*b* can extract data from the document. The device 102 can also transmit a status report for the document to the configuration service 104 over the operations communication channel 112.

In order to minimize the opportunity for unwanted data exfiltration, the device 102 can discard data related to the document after the document is sent to appropriate service(s). In other words, the device 102 can be viewed as an "Internet of Things" device (IoT) whereby it preserves minimal local state but instead serves to ingest and pass on data for the larger document processing system. The device 102 can retain information for validating custody of the document (e.g., a signed hash of the document) while still erasing other information related to the document. The device 102 can maintain limited state such that it is only capable of allowing services to accessorize with it. In other words, should the device 102 be entirely compromised, an attacker would not be able to use information within the device 102 to compromise other systems.

The document service 110 can confirm receipt of the document (step 226). If the connection between the device 102 and the document service 110 is unreliable, the document service 110 might not receive a complete document package. The device 102 can inform the document service 110 of the page count or other descriptors of the document and the document service 110 can verify that each page has been received. If a page is missing, corrupted, or otherwise does not satisfy full receipt of the document, the document service 110 can notify the device 102 of the error. The document service 110 can analyze parameters of the relevant workflow and sets expectations such as page count appropriately. The document service 110 can confirm receipt via a status update directly to the device 102, another service within a secure network, or the configuration service 104.

The device 102 can indicate that the document service 110 has received the document (step 228). For example, a status indicator on the device 102 can indicate the status of the document within the workflow and can indicate that the document has been successfully transmitted to the document service.

The document service 110 can validate the document (step 230). The workflow can include various instructions and parameters for validating the document. For example, the workflow can specify that certain fields must be completed and the range or type of acceptable values for certain fields. Validation can include that one or more digital and/or "wet" signatures are present in the document. A digital signature can be supplied at the device 102. A regular expression can be applied to extracted data for validation. A calculation can be performed to ensure that certain fields correct based on other fields (e.g., determining that a user summation is correct). If data for a field is outside a normal value, the document service 110 can throw a tentative validation error that can notify the device 102 of a possible error and thus prompt further review.

The device 102 can indicate that the document has been validated (step 232). If a validation error occurs, the device 102 can indicate where the validation error occurred and why it did not pass validation. The device 102 can display a portion of the scanned image with the problematic field and indicate why that region fails validation. If a signature is missing, the device 102 can display an image of the empty signature box, the page number of the signature box, and an instruction that the signature box must be signed. The device 102 can show a field with an incorrect number and indicate why that number did not pass validation (e.g., it was an incorrect sum or outside of an acceptable range). If the device 102 presents possible problems such as fields that are technically valid but likely erroneous, the device 102 can provide an option for the user to approve the field (e.g., to indicate that the data is correct) or reject the field thus invalidating the document. If there are multiple problematic fields, the device can present multiple errors at a time and/or allow a user to cycle through problematic fields. The user can then override the validation, resubmit (e.g., rescan) the entire document, or resubmit a portion of the document.

Figure 3A:
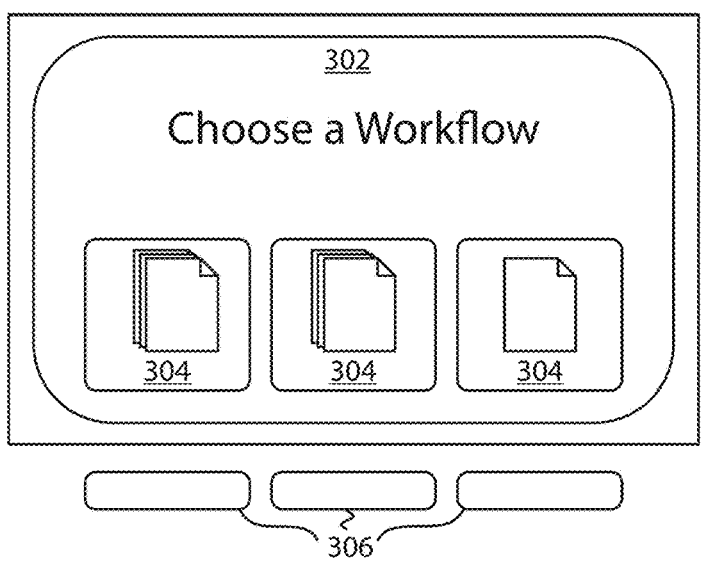
FIGS. 3A-3C illustrate an example scanner interface illustrating a validation error according to some embodiments of the present invention.
Figure 3B:
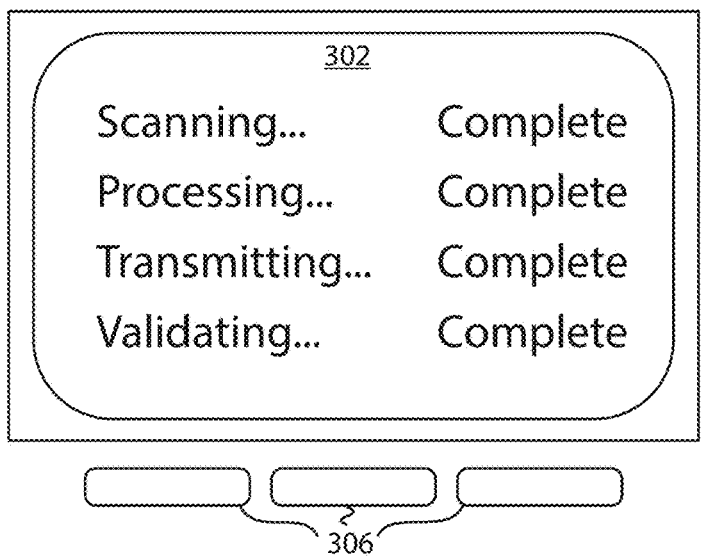
Figure 3C:
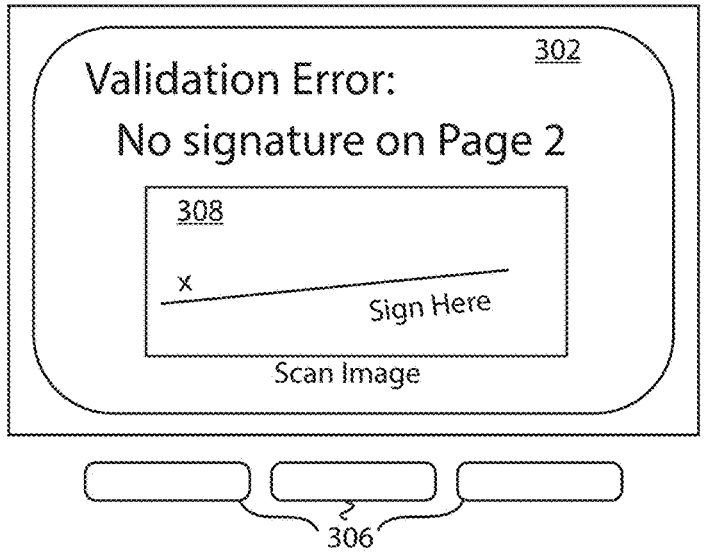

FIGS. 3A-3C illustrate an example scanner interface 300 illustrating a validation error according to some embodiments. As described herein, the interface 300 can be physically located on the device 102 or on an ancillary device such as a phone or computer. While the interface 300 in FIGS. 3A-3C is a graphical interface, other interfaces are contemplated such as an audio interface with speech recognition. In FIG. 3A, the interface presents an option on a screen 302 to select a workflow 304 out of three selectable workflows. While the graphics in FIG. 3A are relatively similar, logos, graphics, icons, and text can distinguish workflows. A user can select a workflow using a corresponding interface element such as a button 306 corresponding to the workflow 304. The display 302 can detect interactions (e.g., a touch-screen display) and the workflow 304 elements themselves are selectable.

The workflow selection and menus can be dependent on which user is at the device 102. For example, certain users may only be authorized to perform certain workflows or certain users may only choose to do certain workflows. These workflows can be presented to the user. Furthermore, when a user selects an item, a sub-menu can be presented that is dependent on the user's credentials, preferences, history, etc. This contextual user interface can provide the context to the configuration service 104 which can then respond with which interface elements should be presented.

In FIG. 3B, the interface 300 indicates a current status of the workflow on the display 302. The status can be merely the current status of actions at the device 102. Additionally status updates be retrieved from various related document services 110 that have reported on their respective responsibilities in relation to the workflow. For example, in FIG. 3B, a document service 110 can report that it has validated the document (or completed a validation step). The configuration service 104 can provide or relay status updates.

In FIG. 3C, the interface 300 indicates that the workflow encountered a validation error for the document. The display 302 can show a document image 308 highlighting the validation error. The document image 308 can be a portion identified by the document service 110 that contains the field that produced the validation error. The interface 300 can display the cause of the error, the location of the error, a document image or portion of a document image 308 of the error, and mitigation steps for how to fix the validation error. For example, the interface 300 can encourage the user to rescan the document. The user can instruct the system to ignore the validation error. The device 102 can then send an instruction to the document service 110 to thus ignore the validation error(s).

FIG. 4 illustrates an example initialization page 400 that can be used to initialize the device 102. This can be part of a set up procedure. For example, the configuration service 104 can provide the initialization page 400 to a user or implementer who can then print the initialization page 400. The device can scan the initialization page 400 and, based on the scanned data, perform some initial configuration tasks such as setting up basic networking and establish a connection to configuration service 104. The initialization page 400 can include human-readable text, a bar code 406, a QR code 408, or any other form of digitizable data. The initialization page 400 can indicate an identifier 402 for the device 102 which the device can manifest in communications with other devices and/or services. The initialization page 400 can identify a location of a configuration service 404. The initialization page 400 can specify a proxy service and credentials for utilizing the proxy service. The initialization page 400 can also provide an authentication key 406 which the device 102 can use to connect with the configuration service 104 over the operations communication channel 112. The information in the initialization page 400 can be encrypted and the device 102 includes data (e.g., a factory-loaded key) to decrypt the information. To generate the initialization page 400, a system can request an identifier which the user can retrieve from the device 102. This identifier can be utilized to encrypt the initialization page 400.

The initialization page 400 can specify security information that cannot be modified without re-initializing the scanner. For example, the initialization page can specify an authorized configuration service 104 which cannot be altered or added to. Therefore, if the configuration service 104 were compromised and send a bad malware update to the device 102, the bad malware update would be unable to cause the device 102 to connect to different services that were not specified by the initialization page 400.

The initialization page 400 can be specific to a single device 102 or can be used to initialize multiple devices 102 within an institution. For example, an institution may have multiple devices 102 that largely perform similar tasks and can be initialized similarly. In another example, an institution may have multiple devices 102 that can be used for different purposes (e.g., one is used to scan bills of lading at a warehouse whereas another is used to scan invoices in an office); each device 102 can scan the same initialization page 400 and further configuration for their respective workflows can occur later (e.g., at the configuration service 104).

Figure 5:
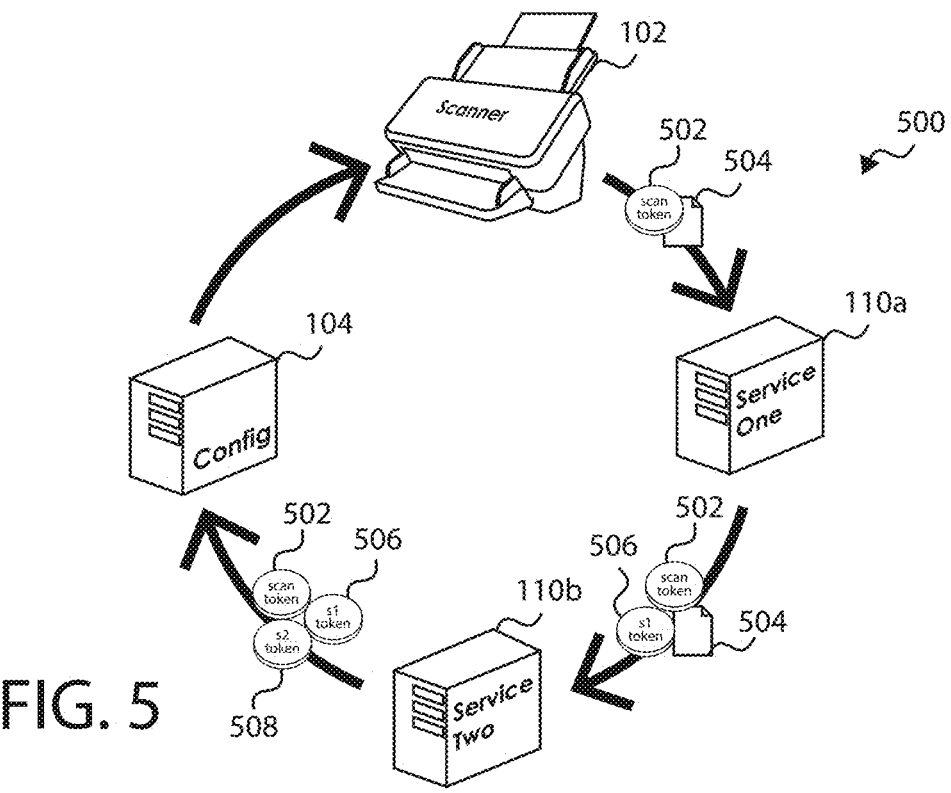
FIG. 5 illustrates an example communication diagram between a scanner, a first document service, a second document service, and a configuration service according to some embodiments of the present invention.

FIG. 5 illustrates an example communication diagram 500 between a scanner 102, a first document service 110a, a second document service 110b, and a configuration service 104. In order to maintain document integrity, some workflows might require proof of a chain of possession. For example, a person can cryptographically sign a document at the device 102 and all other devices, systems, and parties can similarly sign or otherwise authenticate the document throughout the workflow. When the document is reviewed later, a system can be sure that the resulting data, images, etc. are authentic and have not been modified by an unauthorized party.

The device 102 can send document data 504 and a scanner token 502 to a first document service 110a. The scanner token 502 (and other tokens described herein) can be single-use tokens bound to the respective documents. The scanner token 502 can incorporate the state of the document as it is transmitted from the device 102. For example, the scanner token can be a signature of the data after the device 102 performs various processing tasks. Each operator of scanner 102 can have their own credentials. The operator credentials can be used to create the scanner token 502.

The first document service 110a can send the document data 504, the scanner token 502, and a first service token 506 to a second document service 110b. For example, the first document service 110a can process the document data 504 and send the resultant data to the second service 110b along with the scanner token 502 and the first service token. The first document service can transmit the original document data 504 as it was received from the device 102 as well as any result data created or modified by the first document service 102. Thus, if an audit of the chain of custody is performed on the data package, any errors or problems can be attributable to a certain step in the chain.

The second document service 110b can send the scanner token 502, the first service token 506 and the second service token 508 to a configuration service 104. The second document service 110b can extract the tokens from a data package to prevent the configuration service 104 from having access to the data. Document data (or derivatives therefrom) can be encrypted such that only authorized services (e.g., excluding the configuration service 104) can access the data. Services and systems can directly communicate respective tokens to the configuration service 104. It should be understood that tokens can reside with the document data and its derivatives. For example, document data, processed document data, and tokens can be stored within a workflow package. An audit service within the secure network can maintain records of tokens and workflow statuses.

The configuration service 104 can communicate to the scanner 102 to indicate a status of service one 110a and/or service two 110b. For example, the configuration service 104 can indicate that service one 110a has completed a certain task and that service two 110b is in the process of completing a respective task. If there are any issues at service one 110a or service two 110b, then the configuration service 104 can so indicate to the scanner 102 which can provide a notification to a user. The configuration service 104 can be associated with multiple scanners 102, the configuration service can use the scanner token 502 to identify which scanner to communicate with (e.g., to indicate a status of service one 110a and service two 110b). Similarly, the configuration service 104 can determine the identities of the various services using their related tokens.

Figure 6A:
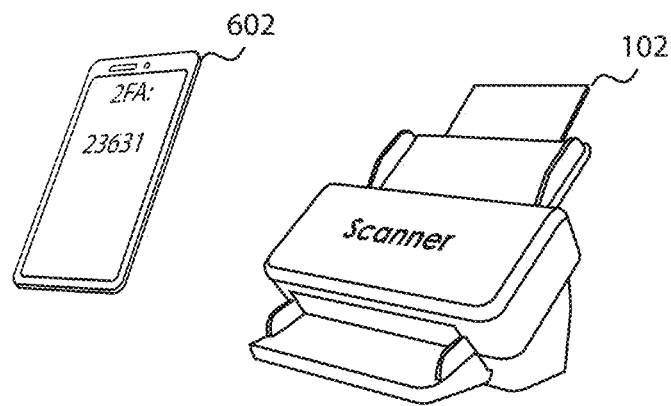
FIGS. 6A and 6B illustrate example authentication techniques according to some embodiments of the present invention.
Figure 6B:
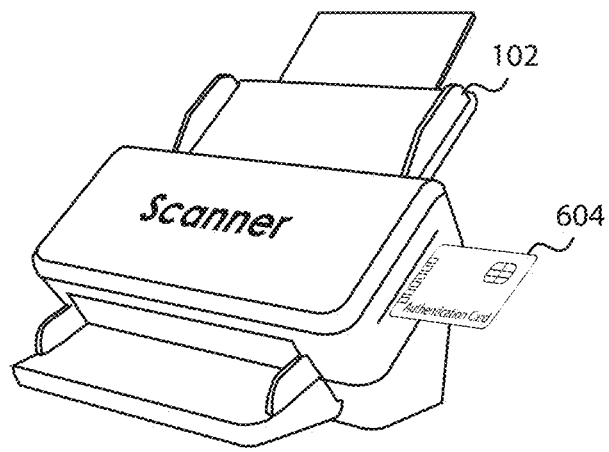

FIGS. 6A and 6B illustrate example authentication techniques. A user operating the device 102 can supply special credentials to access certain workflows. The user can supply a traditional username and password or PIN. In some embodiments a user can merely select their account in an interface on the device 102. Some workflows may benefit from added security, especially to ensure that a chain of possession is maintained. For example, a criminal evidence department may require that the officer that retrieved the document at the crime scene is also the officer that scans the document at the device 102. In order to prevent a different user pretending to be the officer from scanning an incorrect document, further security measures can be taken. The example authentication techniques can be utilized to generate tokens or other authentication information as demonstrated in FIG. 5.

In FIG. 6A, a user can input a code generated by a multifactor authentication device 602 such as a phone or code generator. For example, the user can select their account on the device 102 and then refer to a code generator 602 to retrieve a one-time-password for their account. The one-time-password can change periodically. In FIG. 6B a user can supply an authentication card 604 for authentication. A system can use multi-factor authentication such as a password and a code from a code generator 602 as well as the authentication card 604.

Figure 7A:
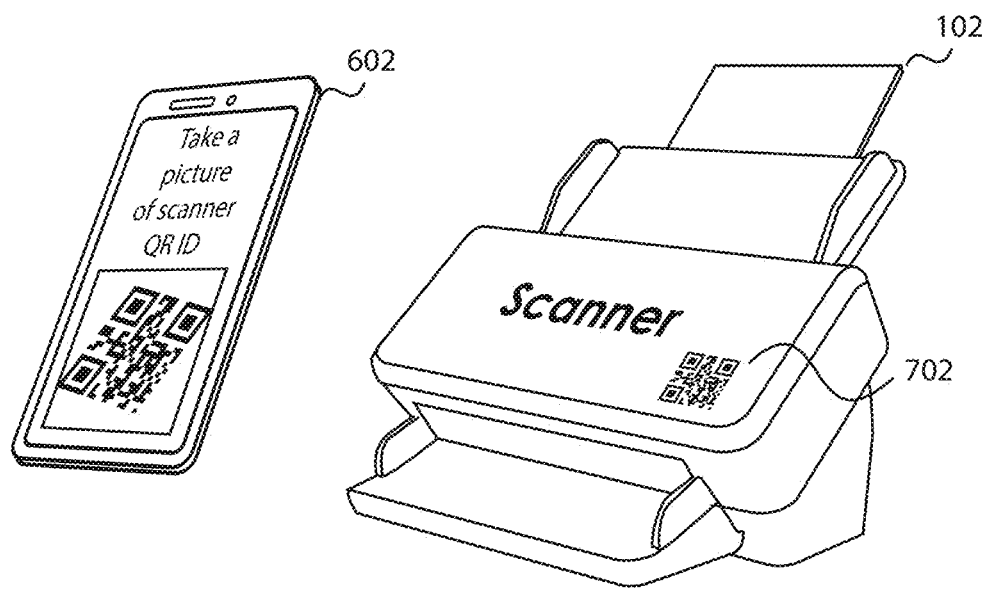
FIGS. 7A and 7B illustrate example techniques for establishing chain of custody according to some embodiments of the present invention.
Figure 7B:
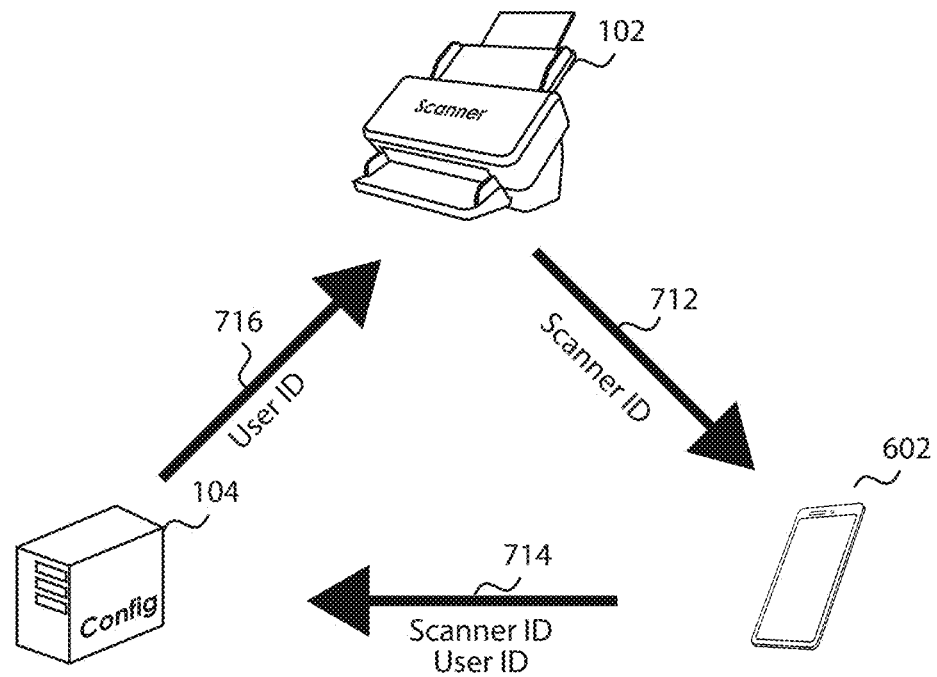

FIGS. 7A-7B illustrate an example technique for communicating a user identity to the device 102. As discussed herein, certain tasks require a chain of custody record. By providing their ID, or some derivative thereof, the user can verify that the user supplied the document to the device 102. While the device 102 might have the ability to directly receive a user identifier as demonstrated in FIGS. 6A and 6B, in some configurations, the device 102 must receive the user identifier or token with the assistance of a separate device or service. One technique includes having a phone 602 (e.g., a portable electronic device) associated with the user supply the user's identifier to the device 102 directly. For example, the phone 602 can present a code on the display of the phone 602 which the device 102 can scan to ingest the identifier. A third device such as the configuration service 104 can be utilized to communicate the user identifier to the device 102 through a secure network connection.

In another embodiment, the phone 602 associated with the user can receive a device identifier 702 from the device 102 as illustrated in FIG. 7A. The phone 602 can then use the device identifier 702 to communicate the user identifier across a network. The device identifier 702 can be static such as a sticker, label, engraving, etc. that is fixed upon the device 102. The device identifier 702 can be dynamic and can be presented on a display of the device 102. The device identifier 702 can be managed by a central system such as the configuration server 104. The device identifier 702 can periodically change. The device identifier 702 can be a single use code that identifies the device 102 as well as the current workflow, project, task, or document. The device identifier 702 can be associated with a current workflow. The phone 602 can detect the device identifier 702 using a camera, microphone, wireless antenna, etc. The user can manually enter the device identifier 702 on the phone 602 (e.g., by typing a code on a screen).

FIG. 7B illustrates an example communication flow between a device 102, phone 602, and configuration service 104. As discussed previously, the phone 602 (e.g., a portable electronic device) of the user can receive the device identifier 702 from the device 102 (step 712). The device identifier 702 can be specific to the particular device and can be used to identify the device 102 on a network. The device identifier 702 can be a single-use identifier or can be static. The device identifier 702 can include information for a current workflow or project. The phone 602 can receive the device identifier 702 using a camera on the phone 602, for example the phone 602 can scan a QR code presented on the device 102.

The phone 602 can then request authentication from the user to ensure the phone 602 is in possession of the user and that the user assents to validating the current task. The phone 602 can include a fingerprint reader, an optical scanner, a facial recognition module, a microphone, an input device, etc. for receiving authentication from the user. The user can provide a PIN, password, etc. for authentication.

The phone 602 can then send the user id and a device id 702 (or derivatives thereof) to the configuration service 104 (step 714). The phone 602 can generate a token based on the device identifier 702. The device 102 can communicate an identifier that is particular to the current job. For example, the device 102 might first scan a document and generate a token for the document (e.g., a hash of the document) which can be communicated to the phone 602. The phone 602 can then sign the document token with the user identifier to create a signed token which can then be transmitted along with the device identifier 702 to the configuration service 104. This can help mitigate the risk that the configuration server and/or the device 102 can be manipulated to falsely present the user identifier as having authenticated an incorrect workflow. The user identifier and device identifier 714 can be communicated to the configuration service 104 in plaintext over a secure channel.

The configuration service 104 can identify the device 102 using the communication from the phone 602. For example, the configuration service 104 can receive the device identifier 702 from the user's phone 602. The device identifier 102 might alone be insufficient to locate the device 102. For example, the device 102 can generate a device identifier 702 specific to a particular workflow and can inform the configuration service that it is awaiting verification from the user regarding the newly generated device identifier 702. The configuration service can maintain a database associating the generated device identifier 702 with the device 102 (and/or location information associated with the device 102). The configuration service 104 can then communicate the user identifier to the device 102. The user identifier can be encrypted by the configuration service 104. The configuration service 104 can generate a single-use user identifier to send to the device 102. The configuration service 104 can send a token generated by the user's phone 602 or some other derivative piece of information indicating that the user has authenticated the current task at the device. For example, the configuration service 104 can send a piece of information indicating that the phone 602 has signed a piece of information associated with the current task at the device 102.

This can be useful if the device 102 scans a document, generates a hash of the document, and indicates to the configuration service 104 that it is waiting for verification for the particular hash. The device 102 can then communicate the hash to the user's phone 602 and the user's phone can then sign the hash using a private key for the user stored on the phone 602 and communicate the signed hash to the configuration service 104. The configuration service 104 can then look up the signed hash in a database to determine that the device 102 is associated with the signed hash. The configuration service 104 can then communicate the signed hash to the device 102. Signing the hash can include attaching signature data to the hash.

After receiving the user identifier (or some derivative thereof), the device 102 can communicate data associated with a current workflow (e.g., a scanned document) as well as the user identifier to a next destination as described herein. Additionally or alternatively, the device 102 can send a token or similar record to the configuration service 104 indicating that the user was the originator of the document.

Figure 8:
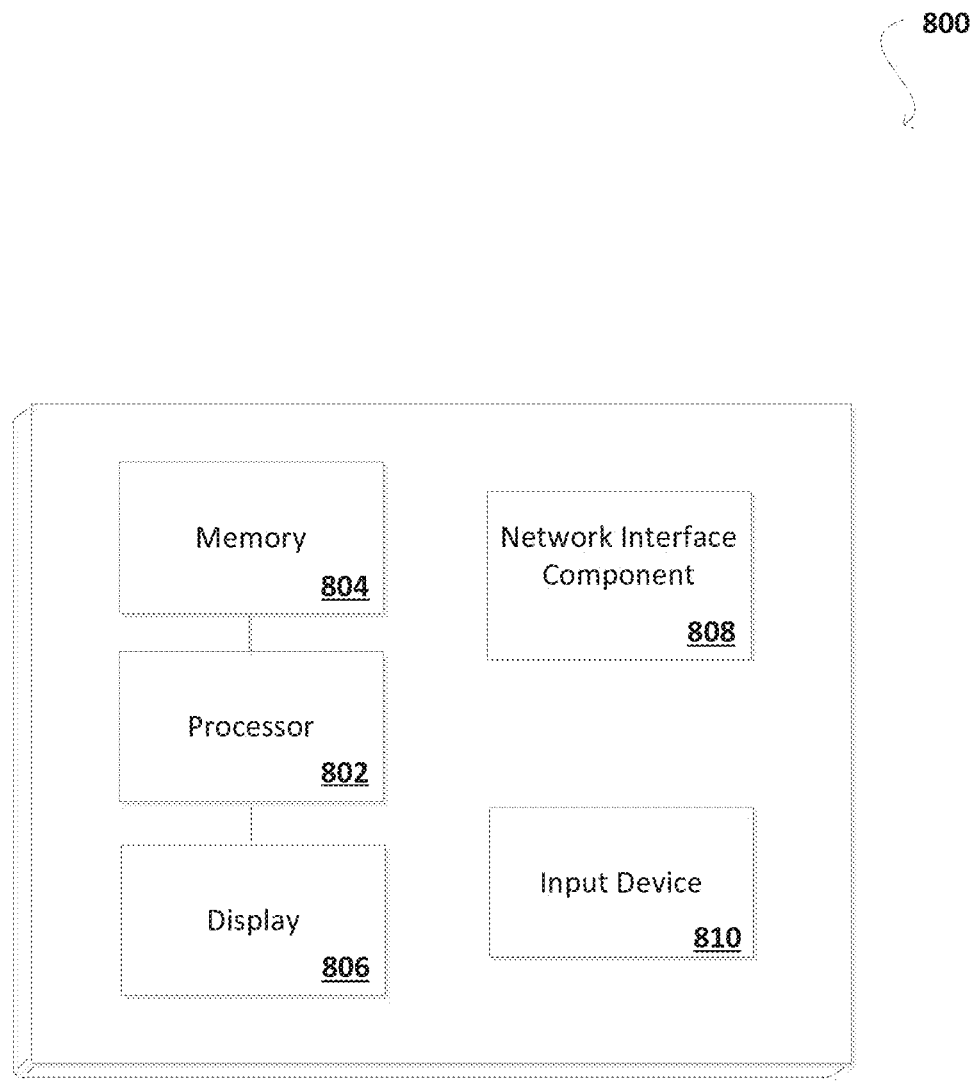
FIG. 8 illustrates example components of a computing device that can be utilized in accordance with various embodiments.

FIG. 8 illustrates a logical arrangement of a set of general components of an example computing device 800 that can be used to implement aspects of the various embodiments. In this example, the device includes a processor 802 for executing instructions that can be stored in a memory device or element 804. As would be apparent to one of ordinary skill in the art, the device can include many types of memory, data storage, or non-transitory computer-readable storage media, such as a first data storage for program instructions for execution by the processor 802, a separate storage for images or data, a removable memory for sharing information with other devices, etc. The device typically will include some type of display element 806, such as a touch screen or liquid crystal display (LCD), although devices such as portable media players might convey information via other means, such as through audio speakers. As discussed, the device in many embodiments will include at least one input element 810 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 800 of FIG. 8 can include one or more network interface components 808 for communicating over various networks, such as a Wi-Fi, Bluetooth, RF, wired, or wireless communication systems. The device in many embodiments can communicate with a network, such as the Internet, and may be able to communicate with other such devices.

Various aspects can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

The invention claimed is:

1. A method for operating a device, comprising:
receiving, from a configuration service and over an operations communication channel, configuration information, wherein the configuration information includes parameters for connecting to a generated content communication channel;
scanning a document at the device, resulting in a scanned document data; and
transmitting the scanned document data from the device to a workflow destination address over the generated content communication channel, wherein the device is configured to prevent the scanned document data from being transmitted over the operations communication channel;
receiving, from a destination associated with the workflow destination address and over the generated content communication channel, an indication that the scanned document data is received;
indicating one or more validation parameters for the scanned document, wherein the one or more validation parameters are directed to physical properties of the document or expected content in the document; and
determining whether the one or more validation parameters have been met.

2. The method of claim 1, further comprising:
configuring the device to communicate over the generated content communication channel based on the parameters for connecting to the generated content communication channel.

3. The method of claim 1, further comprising:
receiving a chain of custody credential associated with an operator of the device; and
indicating, by the device, possession of the document using the chain of custody credential.

4. The method of claim 1, further comprising:
scanning, at the device, an initialization document;
detecting, at the device, initialization information in the scanned initialization document; and configuring the device to communicate over the operations communication channel based on the initialization information.

5. The method of claim 1, further comprising:

receiving, from the destination associated with the workflow destination address and over the generated content communication channel, an indication that the scanned document data has passed the one or more validation requirements; and presenting an indication at the device that the workflow is complete.

6. The method of claim 1, further comprising:

receiving, from a destination associated with the workflow destination address and over the generated content communication channel, an indication that the scanned document data has failed one or more of the one or more validation requirements; and presenting an indication at the device that the workflow is incomplete.

7. The method of claim 6, further comprising:

presenting, at the device, a selectable element to retry the scanning of the document;

receiving a selection of the selectable element;

scanning the document, resulting in second scanned document data; and transmitting the second scanned document data to the destination address over the generated content communication channel.

8. The method of claim 1, further comprising:

determining, via the operations communication channel, that an update is available;

receiving the update over the operations communication channel; and applying the update to the device.

9. The method of claim 1, further comprising:

determining a workflow license requirement; and identifying, from the configuration information, license information usable to satisfy the workflow license requirement.

10. The method of claim 1, further comprising:

determining, using the configuration information, a selectable element associated with the workflow; and presenting the selectable element.

11. The method of claim 1, further comprising:

receiving, from a destination associated with the workflow destination address and over the generated content communication channel, an indication that the scanned document data has failed one or more of the one or more validation requirements; and presenting an indication at the device that the workflow is incomplete.

12. The computing device of claim 11, wherein the instructions when executed by the processor further cause the device to:

present, at the device, a selectable element to retry the scanning of the document;

receive a selection of the selectable element;

scan the document, resulting in second scanned document data; and transmit the second scanned document data to the destination address over the generated content communication channel.

13. The method of claim 1, further comprising generating and transmitting a token associated with the document, wherein the token is generated based on the state of the document as it is transmitted from the device.

14. A computing device, comprising:

a processor; and a memory device including instructions that, when executed by the processor, cause the computing device to:

receive, from a configuration service and over an operations communication channel, wherein the configuration information includes parameters for connecting to a generated content communication channel scan a document at the device, resulting in a scanned document data; s transmit the scanned document data from the device to a workflow destination address over the generated content communication channel, wherein the device is configured to prevent the scanned document data from being transmitted over the operations communication channel;

receive, from a destination associated with the workflow destination address and over the generated content communication channel, an indication that the scanned document data is received;

indicate one or more validation parameters for the scanned document, wherein the one or more validation parameters are directed to physical properties of the document or expected content in the document; and determine whether the one or more validation parameters have been met.

15. The computing device of claim 14, wherein the instructions when executed by the processor further cause the device to:

configure the device to communicate over the generated content communication channel based on the on the parameters for connecting to the generated content communication channel.

16. The computing device of claim 14, wherein the instructions when executed by the processor further cause the device to:

scan, at the device, an initialization document;

detect, at the device, initialization information in the scanned initialization document; and configure the device to communicate over the operations communication channel based on the initialization information.

17. The computing device of claim 14, wherein the instructions when executed by the processor further cause the device to:

receive, from the destination associated with the workflow destination address and over the generated content communication channel, an indication that the scanned document data has passed the one or more validation requirements; and present an indication at the device that the workflow is complete.

18. The computing device of claim 14, wherein the instructions when executed by the processor further cause the device to:

determine, via the operations communication channel, that an update is available;

receive the update over the operations communication channel; and apply the update to the device.

19. The computing device of claim 14, wherein the instructions when executed by the processor further cause the device to:
   determine, using the configuration information, a selectable element associated with the workflow; and
   present the selectable element, wherein the receiving a selection of the workflow comprises receiving a selection of the selectable element.

20. The computing device of claim 14, wherein the instructions when executed by the processor further cause the device to:
   generate and transmit a token associated with the document, wherein the token is generated based on the state of the document as it is transmitted from the device.

* * * * *